United States Patent
Emley

(10) Patent No.: US 8,264,797 B2
(45) Date of Patent: Sep. 11, 2012

(54) HEAD GIMBAL ASSEMBLY HAVING A RADIAL ROTARY PIEZOELECTRIC MICROACTUATOR BETWEEN A READ HEAD AND A FLEXURE TONGUE

(75) Inventor: Nathan C. Emley, San Francisco, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 301 days.

(21) Appl. No.: 12/643,935

(22) Filed: Dec. 21, 2009

(65) Prior Publication Data

US 2011/0149439 A1 Jun. 23, 2011

(51) Int. Cl.
*G11B 5/56* (2006.01)

(52) U.S. Cl. .................................... 360/294.4
(58) Field of Classification Search ................ 360/294.4
See application file for complete search history.

(56) References Cited

U.S. PATENT DOCUMENTS

| | | | |
|---|---|---|---|
| 5,465,186 A | 11/1995 | Bajorek et al. | |
| 5,894,651 A | 4/1999 | Dvorsky et al. | |
| 5,920,145 A | 7/1999 | Wu et al. | |
| 5,920,978 A | 7/1999 | Koshikawa et al. | |
| 6,052,879 A | 4/2000 | Wu et al. | |
| 6,262,869 B1 | 7/2001 | Lin et al. | |
| 6,291,930 B1 | 9/2001 | Sager | |
| 6,320,730 B1 | 11/2001 | Stefansky et al. | |
| 6,351,352 B1 | 2/2002 | Khan et al. | |
| 6,351,353 B1 | 2/2002 | Sluzewski et al. | |
| 6,351,354 B1 | 2/2002 | Bonin | |
| 6,487,045 B1 | 11/2002 | Yanagisawa | |
| 6,501,625 B1 | 12/2002 | Boismier et al. | |
| 6,570,730 B1 | 5/2003 | Lewis et al. | |
| 6,624,984 B2 | 9/2003 | Lewis et al. | |
| 6,661,619 B2 | 12/2003 | Nishida et al. | |
| 6,760,196 B1 | 7/2004 | Niu et al. | |
| 6,807,030 B1 | 10/2004 | Hawwa et al. | |
| 6,870,709 B2 | 3/2005 | Shimanouchi et al. | |
| 6,883,215 B2 | 4/2005 | Takeuchi et al. | |
| 6,928,722 B2 | 8/2005 | Yanagisawa | |
| 6,961,221 B1 | 11/2005 | Niu et al. | |
| 7,023,663 B2 | 4/2006 | Yao et al. | |
| 7,057,857 B1 | 6/2006 | Niu et al. | |
| 7,057,858 B2 * | 6/2006 | Pan et al. | 360/294.4 |
| 7,072,149 B2 | 7/2006 | Kuwajima et al. | |
| 7,082,671 B2 | 8/2006 | Yanagisawa | |
| 7,151,650 B2 | 12/2006 | Lee | |
| 7,159,300 B2 | 1/2007 | Yao et al. | |

(Continued)

OTHER PUBLICATIONS

Kuwajima et al., "Thin-Film Piezoelectric DSA for HDD", IEEE Trans. Magn., vol. 38, No. 5, Sep. 2002, pp. 2186-2188.

(Continued)

*Primary Examiner* — Allen Heinz

(57) ABSTRACT

A novel head gimbal assembly (HGA) includes a piezoelectric microactuator having a first side and an opposing second side. The first side includes a plurality of anchor regions that extend radially from a center point and are bonded to the gimbal tongue. The first side also includes a first plurality of non-bonded regions lying between the anchor regions. The second side includes a plurality of link regions that extend radially from the center point and are bonded to a top surface of the read head. The second side also includes a second plurality of non-bonded regions lying between the link regions. Each of the plurality of link regions is angularly spaced between two of the plurality of anchor regions.

24 Claims, 3 Drawing Sheets

U.S. PATENT DOCUMENTS

| | | |
|---|---|---|
| 7,248,444 B1 | 7/2007 | Lauer |
| 7,277,257 B2 | 10/2007 | Hipwell, Jr. et al. |
| 7,280,319 B1 | 10/2007 | McNab |
| 7,301,731 B2 | 11/2007 | Mita et al. |
| 7,312,941 B2 | 12/2007 | Hirano et al. |
| 7,345,851 B2 | 3/2008 | Hirano et al. |
| 7,352,538 B2 | 4/2008 | Kurihara et al. |
| 7,382,583 B2 | 6/2008 | Hirano et al. |
| 7,417,831 B2 | 8/2008 | Yao et al. |
| 7,420,785 B2 | 9/2008 | Yamazaki et al. |
| 7,466,520 B2 | 12/2008 | White et al. |
| 7,471,490 B2 | 12/2008 | Yao |
| 7,474,512 B2 | 1/2009 | Yao et al. |
| 7,535,680 B2 | 5/2009 | Yao et al. |
| 7,538,984 B2 | 5/2009 | Yao |
| 7,567,019 B2 * | 7/2009 | Yamanaka et al. ............ 310/328 |
| 7,609,487 B2 | 10/2009 | Yao et al. |
| 7,663,843 B2 | 2/2010 | Yao |
| 7,684,158 B1 | 3/2010 | Lauer |
| 7,701,675 B2 | 4/2010 | Yao et al. |
| 7,719,798 B2 | 5/2010 | Yao |
| 7,733,607 B2 | 6/2010 | Yao et al. |
| 7,916,427 B1 | 3/2011 | Lauer |
| 8,015,692 B1 | 9/2011 | Zhang et al. |
| 8,111,487 B2 | 2/2012 | Lauer |
| 2002/0191342 A1 | 12/2002 | Yanagisawa |
| 2007/0291419 A1 | 12/2007 | Lee et al. |
| 2008/0024933 A1 | 1/2008 | Yao et al. |
| 2008/0198511 A1 | 8/2008 | Hirano et al. |
| 2009/0021857 A1 | 1/2009 | Shelor |
| 2011/0149439 A1 | 6/2011 | Emley |
| 2011/0176242 A1 | 7/2011 | Lauer |

OTHER PUBLICATIONS

Oldham et al., "Thin-Film PZT Lateral Actuators With Extended Stroke", Journal of Microelectromechanical Systems, vol. 17, No. 4, Aug. 2008, pp. 890-899.

Seo et al., "Laterally driven thin film PZT actuator with high-aspect-ratio silicon beam for stroke amplification", Sensors and Actuators A, vol. 127 (2006), pp. 302-309.

* cited by examiner

HEAD GIMBAL ASSEMBLY HAVING A RADIAL ROTARY PIEZOELECTRIC MICROACTUATOR BETWEEN A READ HEAD AND A FLEXURE TONGUE

BACKGROUND OF THE INVENTION

1. Field of the Invention

The present invention relates generally to the field of information storage devices, and more particularly to head gimbal assemblies that are used in information storage devices and that include a microactuator.

2. Background of the Art

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g. writing, flying height control, touch down detection, lapping control, etc).

In a modern magnetic hard disk drive device, each read head is a sub-component of a head gimbal assembly (HGA). The read head typically includes a slider and a read/write transducer. The read/write transducer typically comprises a magneto-resistive read element (e.g. so-called giant magneto-resistive read element, or a tunneling magneto-resistive read element) and an inductive write structure comprising a flat coil deposited by photolithography and a yoke structure having pole tips that face a disk media.

The HGA typically also includes a suspension assembly with a laminated flexure to carry the electrical signals to and from the read head. The read head is typically bonded to a tongue feature of the laminated flexure. The HGA, in turn, is a sub-component of a head stack assembly (HSA) that typically includes a plurality of HGAs, a rotary actuator, and a flex cable. The plurality of HGAs are attached to various arms of the rotary actuator, and each of the laminated flexures of the HGAs has a flexure tail that is electrically connected to the HSA's flex cable.

Modern laminated flexures typically include electrically conductive copper traces that are isolated from a stainless steel support layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that are electrically connected to a plurality of electrically conductive bonding pads on the head, and extend from adjacent the head to terminate at electrical connection points at the flexure tail.

The position of the HSA relative to the spinning disks in a disk drive, and therefore the position of the read heads relative to data tracks on the disks, is actively controlled by the rotary actuator which is typically driven by a voice coil motor (VCM). Specifically, electrical current passed through a coil of the VCM applies a torque to the rotary actuator, so that the read head can seek and follow desired data tracks on the spinning disk.

However, the industry trend towards increasing areal data density has necessitated substantial reduction in the spacing between data tracks on the disk. Also, disk drive performance requirements, especially requirements pertaining to the time required to access desired data, have not allowed the rotational speed of the disk to be reduced. In fact, for many disk drive applications, the rotational speed has been significantly increased. A consequence of these trends is that increased bandwidth is required for servo control of the read head position relative to data tracks on the spinning disk.

One solution that has been proposed in the art to increase disk drive servo bandwidth is dual-stage actuation. Under the dual-stage actuation concept, the rotary actuator that is driven by the VCM is employed as a coarse actuator (for large adjustments in the HSA position relative to the disk), while a so-called "microactuator" having higher bandwidth but lesser stroke is used as a fine actuator (for smaller adjustments in the read head position). Several microactuator designs and servo control recipes have been proposed in the art for the purpose of dual-stage actuation in disk drive applications.

However, the addition of one or more microactuators in a disk drive can be costly and troublesome. For example, the additional components of the microactuators add cost to the disk drive, as do the additional manufacturing steps required for fabrication and assembly of a disk drive that includes microactuators. Furthermore, the increased complexity of the actuation system can reduce disk drive manufacturing yield, and increase the frequency of disk drive failures during operation in the field. The increased development time to successfully implement a complex dual stage actuation system can delay product introduction, which may result in a significant opportunity cost to a disk drive manufacturer.

Therefore, there is a need in the art for a microactuator design that is useful for dual stage actuation in disk drive applications, and has acceptable cost and manufacturability for profitable high-volume production.

SUMMARY

A novel head gimbal assembly (HGA) includes a read head, a load beam, and a piezoelectric microactuator. The read head has an air bearing surface and an opposing top surface. A flexure is attached to the load beam, and the flexure includes a tongue having a tongue major surface. The piezoelectric microactuator has a first side and an opposing second side. The first side faces and is generally parallel to the tongue major surface. The first side includes a plurality of anchor regions that extend radially from a center point. Each of the plurality of anchor regions is bonded to the tongue. The first side also includes a first plurality of non-bonded regions that are not bonded to the tongue. Each of the first plurality of non-bonded regions lies between two of the plurality of anchor regions. The second side includes a plurality of link regions that extend radially from the center point. Each of the plurality of link regions is bonded to the top surface of the read head. The second side also includes a second plurality of non-bonded regions that are not bonded to the top surface of the read head. Each of the second plurality of non-bonded regions lies between two of the plurality of link regions. Each of the plurality of link regions is angularly spaced between two of the plurality of anchor regions.

DETAILED DESCRIPTION OF EXEMPLARY EMBODIMENTS

Figure 1:
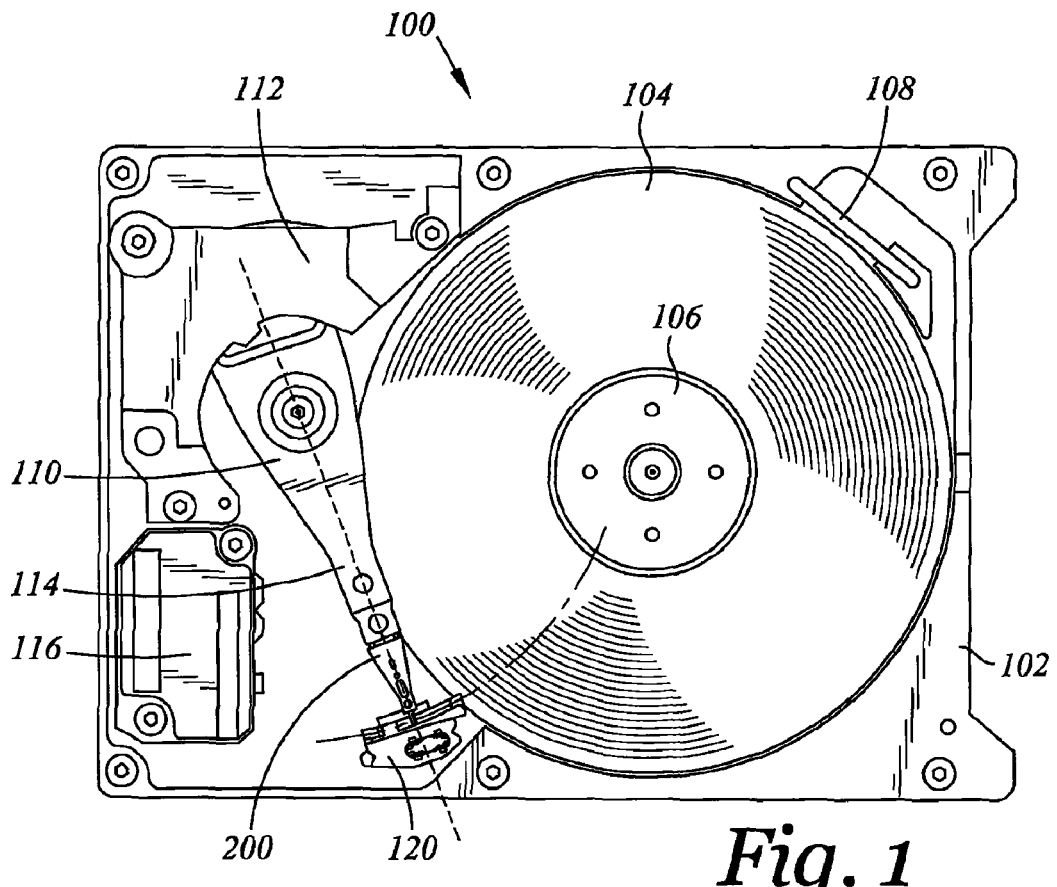
FIG. 1 is top view of a disk drive capable of including an embodiment of the present invention.

FIG. 1 is top view of a disk drive 100 that is capable of including an embodiment of the present invention. The disk drive 100 includes a disk drive base 102 and an annular magnetic disk 104. The disk drive 100 further includes a spindle 106, rotably mounted on the disk drive base 102, for rotating the disk 104. The rotation of the disks 104 establishes air flow through recirculation filter 108. In certain embodiments, disk drive 100 may have only a single disk 104, or alternatively, two or more disks.

The disk drive 100 further includes a rotary actuator 110 that is rotably mounted on disk drive base 102. The rotary actuator 110 includes an actuator arm 114 that supports a head gimbal assembly (HGA) 200. Voice coil motor 112 rotates the actuator 110 through a limited angular range so that the HGA 200 may be desirably positioned relative to one or more tracks of information on the disk 104. Preferably the disk drive 100 will include one HGA 200 per disk surface, but depopulated disk drives are also contemplated in which fewer HGAs are used. Under non-operating conditions the HGAs may be parked on ramp 120 to avoid contact with the disk 104 when it is not spinning. Electrical signals to/from the HGA 200 are carried to other drive electronics via a flex cable bracket 116.

Figure 2:
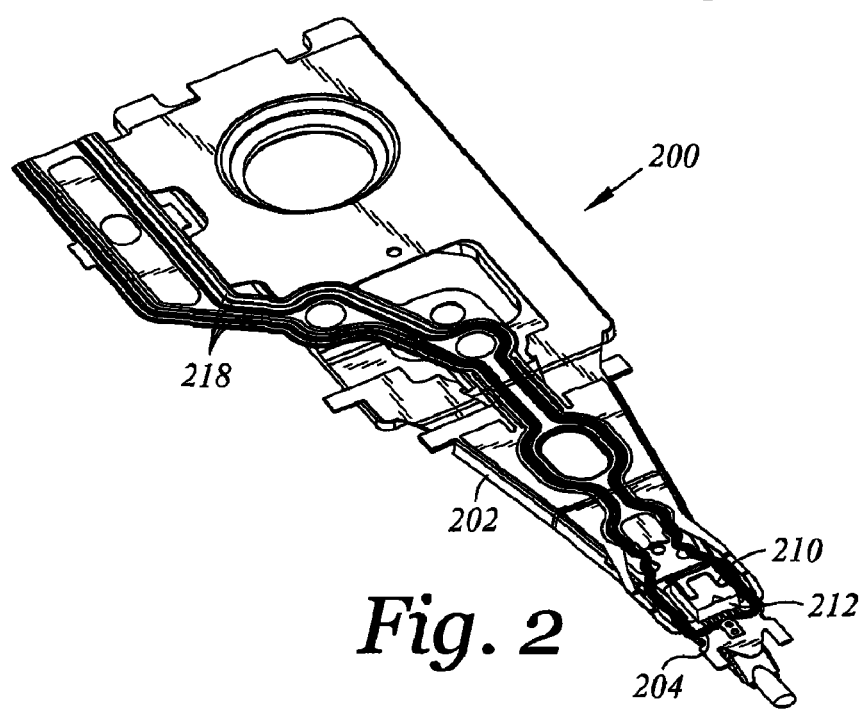
FIG. 2 is a bottom perspective view of a head gimbal assembly (HGA) capable of including an embodiment of the present invention.

FIG. 2 is a bottom perspective view of an HGA 200 that is capable of including an embodiment of the present invention. The HGA 200 includes a load beam 202, and a read head 210 for reading and writing data from and to a magnetic disk (e.g. disk 104). The read head 210 includes a slider substrate having an air bearing surface (the label 210 points to this surface) and an opposing top surface (not visible in the view of FIG. 2). The slider substrate preferably comprises AlTiC, although another ceramic or silicon might also be used. The slider substrate of the read head 210 also includes a trailing face 212 that includes a read/write transducer (too small to be practically shown in the view of FIG. 2, but disposed on the trailing face 212). In certain embodiments, the read/write transducer is preferably an inductive magnetic write transducer merged with a magneto-resistive read transducer. The purpose of the load beam 202 is to provide vertical compliance for the read head 210 to follow vertical undulations of the surface of a disk (e.g. disk 104 of FIG. 1) as it rotates, and to preload the air bearing surface of the read head 210 against the disk surface by a preload force that is commonly referred to as the "gram load."

The HGA 200 also includes a laminated flexure 204 attached to the load beam 202. The head 210 is attached to a tongue of the laminated flexure 204. The tongue is not easily visible in the view of FIG. 2 because the read head 210 mostly obscures it. A first purpose of the laminated flexure 204 is to provide compliance for the head 210 to follow pitch and roll angular undulations of the surface of the (e.g. disk 104) as it rotates, while restricting relative motion between the read head 210 and the load beam 202 in the lateral direction and about a yaw axis. A second purpose of the laminated flexure 204 is to provide a plurality of electrical paths to facilitate signal transmission to/from the read head 210. For that second purpose, the laminated flexure 204 includes a plurality of electrically conductive traces 218 that are defined in an electrically conductive (e.g. copper) sub-layer of the laminated flexure 204. Electrically conductive traces 218 are isolated from a support layer (e.g. stainless steel) by a dielectric layer (e.g. polyimide).

Figure 3:
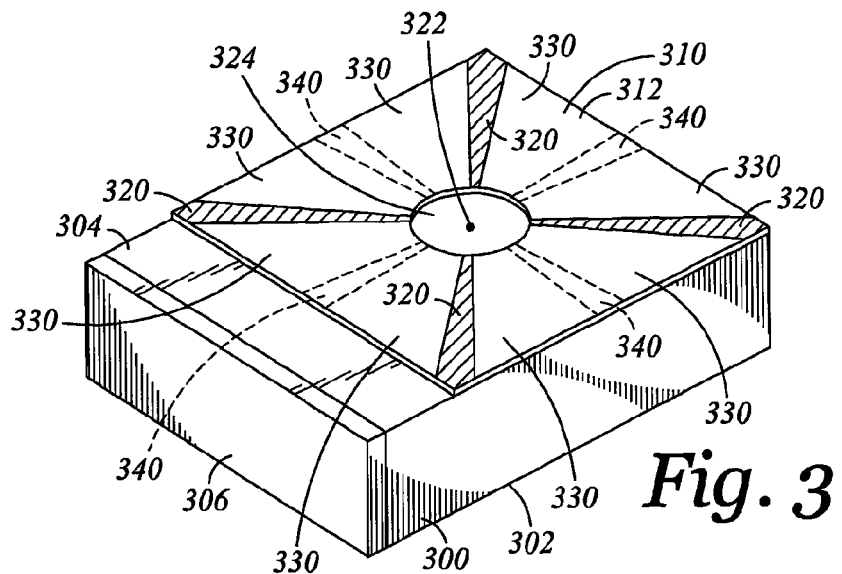
FIG. 3 is a top perspective view of a read head and a piezoelectric microactuator according to an embodiment of the present invention.

FIG. 3 is a top perspective view of a read head 300 and a piezoelectric microactuator 310 according to an embodiment of the present invention. The read head 300 has an air bearing surface 302 and an opposing top surface 304. The read head 300 also has a trailing face 306 that includes a read transducer (not shown) and may also include a write transducer, etc. The piezoelectric microactuator 310 has a first side 312 and an opposing second side (not visible in the view of FIG. 3, because it is the underside of the piezoelectric microactuator 310 that faces the top surface 304 of the read head 300). The piezoelectric microactuator 310 preferably has a maximum thickness, measured approximately normal to the tongue major surface, in the range 5 microns to 50 microns.

In the embodiment of FIG. 3, the first side 312 of the piezoelectric microactuator 310 faces and is generally parallel to a major surface of the flexure tongue (not shown in FIG. 3). The first side 312 of the piezoelectric microactuator 310 includes four anchor regions 320 that extend radially from a center point 322. Each of the anchor regions 320 is bonded to the flexure tongue, which is what qualifies it to be referred to as an "anchor" region. The first side 312 of the piezoelectric microactuator 310 also includes four non-bonded regions (regions between the anchor regions 320) that are not bonded to the flexure tongue. Each of the non-bonded regions lies between two of the anchor regions 320.

In the embodiment of FIG. 3, a hole 324 extends through the piezoelectric microactuator, and the hole 324 includes the center point 322. The hole 324 preferably has a diameter in the range 0.1 mm to 0.5 mm. A hole having a diameter in this range may advantageously remove portions of the piezoelectric microactuator 310 that might otherwise experience excessive shear stresses if relative vertical motion is imparted by the read head 300 (for example due to operational shock, etc). In some cases, such high shear stresses might cause material fracture, cracking, de-poling of piezoelectric layers, and/or cyclic fatigue.

Each of the plurality of anchor regions 320 is preferably an anchor plateau that protrudes from the first side 312 in a direction that is approximately normal to the tongue major surface. In such embodiments, each of the non-bonded regions (between the anchor regions 320) is recessed from the flexure tongue major surface relative to an adjacent anchor plateau. For example, each of the anchor plateaus may protrude from the first side 312 (in a direction that is approximately normal to the tongue major surface) by at least 1 micron to 20 microns, relative to the non-bonded regions between them. The anchor plateaus preferably have a laminated structure, for example including one or more malleable metal layers and one or more dielectric layers (e.g. an insulative ceramic). For example, the anchor plateaus may include an alumina or silicon oxide (e.g. $SiO_2$) layer adjacent the piezoelectric material, for example with one or more patterned gold layers on top of that for adhesion to the gimbal tongue and to carry signals from the laminated flexure. The alumina or silicon oxide layer(s) may include one or more vias for electrical connection to a conductive layer of the laminated flexure in the region of the gimbal tongue.

However, the anchor regions 320 alternatively might be formed by a mere distribution of adhesive rather than any actual plateaus in the piezoelectric microactuator 310. Alternatively, a plurality of recessions might be etched into the flexure tongue to distinguish between the anchor regions 320 and non-bonded regions between them.

The second side of piezoelectric microactuator 310 (its underside from the perspective of FIG. 3) includes a plurality of link regions 340 that extend radially from the center point 322. The link regions 340 are shown in phantom lines since they would not normally be visible from the perspective of FIG. 3 (because they would protrude downward from the underside of the piezoelectric microactuator 310 in FIG. 3). Each of the plurality of link regions 340 is bonded to the top surface 304 of the read head 300. Four non-bonded regions, that are not bonded to the top surface of the read head, lie on the second side of the piezoelectric microactuator 310 between each pair of the plurality of link regions 340. Note that each of the plurality of link regions 340 is angularly spaced between two of the plurality of anchor regions 320. Preferably, in the embodiment of FIG. 3, each of the link regions 340 is angularly spaced between two of the plurality of anchor regions 320 by an average angular spacing of no more than 45°. Such inequality is preferred for embodiments that include at least four anchor regions 320 and at least four link regions 340.

Each of the plurality of link regions 340 is preferably a link plateau that protrudes from the second side of the piezoelectric microactuator 310 in a direction that is approximately normal to the top surface 304 of the read head 300. In such embodiments, each of the non-bonded regions (between the link regions 340) is recessed from the top surface 304 of the read head 300 relative to an adjacent link plateau. For example, each of the link plateaus may protrude from the second side (in a direction that is approximately normal to the top surface 304 of the read head 300) by at least 1 micron to 20 microns, relative to the non-bonded regions between them. The link plateaus preferably have a laminated structure, for example including a malleable metal layer and a dielectric ceramic layer. For example, the link plateaus may include a perforated alumina or silicon oxide (e.g. $SiO_2$) layer adjacent the piezoelectric material, for example with one or more patterned gold layers on top of that for adhesion to the top surface 304 of the read head 300 and to carry signals to/from the laminated flexure.

However, the link regions 340 alternatively might be formed by a mere distribution of adhesive rather than any actual plateaus in the piezoelectric microactuator 310. Alternatively, a plurality of recessions might be etched into the top surface of the read head (e.g. at the bar level stage of slider fabrication) to distinguish between the link regions 340 and non-bonded regions between them.

The embodiment of FIG. 3 includes eight wedge-shaped free regions 330 that are common to both the non-bonded regions on the first side 312 (between anchor regions 320) and the non-bonded regions on the second side (the underside of piezoelectric microactuator 310). The free regions 330 are neither bonded to the flexure tongue nor to the read head 300, which is why they are referred to as "free" regions. In certain embodiments, the free regions 330 are not only non-bonded to the flexure tongue and the read head 300, but also do not contact the flexure tongue and the read head 300. In such embodiments the free regions 330 are also referred to as being "suspended" regions, and surface friction between them and the flexure tongue and/or read head 300 is negligible.

Figure 4:
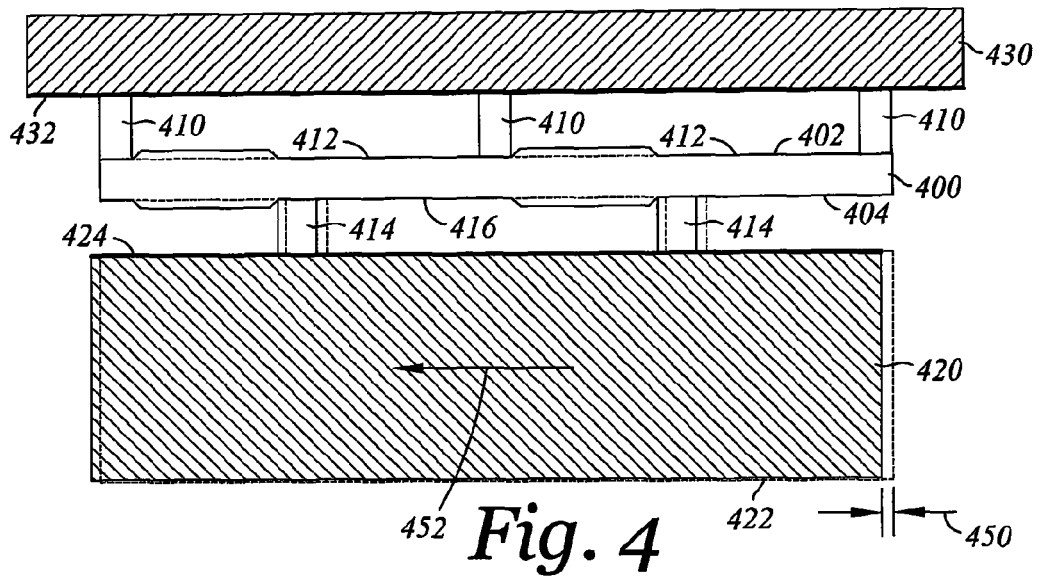
FIG. 4 depicts a side-view schematic illustration of the operation of a piezoelectric microactuator according to an embodiment of the present invention.

FIG. 4 depicts a side-view schematic illustration of the operation of a piezoelectric microactuator 400 according to an embodiment of the present invention. Read head 420 has an air bearing surface 422 and an opposing top surface 424. The piezoelectric microactuator 400 has a first side 402 and an opposing second side 404. The first side 402 faces and is generally parallel to a major surface 432 of a flexure tongue 430. The first side 402 includes a plurality of anchor regions 410. Each of the plurality of anchor regions 410 is bonded to the tongue 430. The first side 402 also includes a first plurality of non-bonded regions 412 that are not bonded to the tongue 430. Each of the first plurality of non-bonded regions 412 lies between two of the plurality of anchor regions 410.

In the embodiment of FIG. 4, the second side 404 includes a plurality of link regions 414, each of which is bonded to the top surface 424 of the read head 420. The second side 404 also includes a non-bonded region 416 that is not bonded to the top surface 424 of the read head 420, and that lies between two of the plurality of link regions 414. Also, each of the plurality of link regions 414 is spaced between two of the plurality of anchor regions 410.

In the embodiment of FIG. 4, microactuation is accomplished by conventional application of electrical fields to the piezoelectric microactuator 400. Preferably, the application of electrical fields is restricted to those that will cause contraction in regions on only one side of the link regions 414. For example, FIG. 4 depicts microactuation of the read head 420 to the left by application of electrical fields that are restricted to regions to the left of each link region 414, causing lateral contraction (and incidental thickening) of the piezoelectric microactuator 400 in only those regions. Specifically, the regions of lateral contraction (and incidental thickening) shown in FIG. 4 are disposed between each of the link regions 414 and the anchor region 410 that lies to its immediate left. The lateral contractions shown in FIG. 4 result in a leftward translation 450 of the read head 420 in the direction of the arrow 452.

Opposite (rightward) microactuation of the read head 420 is preferably accomplished by application of electrical fields that are restricted to those which will cause contraction in regions to the right of each link region 414—causing lateral contraction (and incidental thickening) of the piezoelectric microactuator 400 in only those regions. Specifically, the regions of lateral contraction (and incidental thickening) for rightward microactuation are disposed between each of the link regions 414 and the anchor region 410 that lies to its immediate right. Such rightward microactuation will cause a rightward translation of the read head 420 in a direction opposing the arrow 452. These same principles as illustrated in FIG. 4 may also be applied to clockwise and counterclockwise microactuation in rotary microactuators, as illustrated in embodiments described later herein.

Simultaneous but differential actuation of both rightward and leftward regions is possible in principle for certain materials such as $Pb[Zr,Ti]O_3$ (hereinafter referred to as "PZT"). For example, it is possible to apply electrical fields to a PZT microactuator to cause the leftward regions to laterally contract, while also applying electrical fields to cause the complimentary rightward regions to laterally expand. Such differential actuation may significantly increase the stroke of the microactuator, for example increasing the distance of leftward translation 450. However, such materials as PZT often suffer from diminished piezoelectric response when an electrical field is applied in such a way as to cause elongation rather than contraction. Hence, although expected microactuator stroke is diminished by application of electrical fields to cause contraction only to one side of the link regions (without applying electrical fields to cause expansion in complimentary regions), such limited application of electrical fields may increase the useful lifetime of the piezoelectric microactuator. Such increase in the useful lifetime may well justify any additional layers that may be required in the piezoelectric microactuator design to provide adequate stroke (without differential actuation).

Actuation of the piezoelectric microactuator may be accomplished by application of a voltage V across its thickness t by two conducting layers positioned on opposite sides. The electric field would be E=V/t. Preferably, the piezoelectric material (e.g. PZT) is polarized normal to its planar structure. The conducting layers are thin relative to the piezoelectric layer and must remain electrically isolated from one another. Additionally, the high-voltage layers between different suspended regions of the microactuator are preferably kept electrically isolated so that voltages can be applied to them independently. Hence, two distinct voltage connections and one ground connection may be required for the piezoelectric microactuator.

Since the piezoelectric microactuator may include suspended regions built from thin films (t<10 μm), such regions may be the structurally weakest point of the head gimbal assembly. The piezoelectric layer stiffness κ goes approximately as $\kappa \propto (t/L)^3$, so to maintain stiffness and structural integrity at a given length L, it is advantageous to keep t as large as possible. However, increasing thickness in the piezoelectric layer weakens the applied electric field. The stiffness of the piezoelectric microactuator may significantly affect the microactuator bandwidth because $f_{resonance} \propto \sqrt{(\kappa/t)} \propto t$ while the stroke per unit volt $\Delta L/V \propto t^{-1}$, so achieving acceptable bandwidth and acceptable stroke are opposing design influences on the thickness of the piezoelectric layer. An advantageous compromise may be reached by inserting additional conductive layers through the thickness of the piezoelectric layer. Such a laminated piezoelectric layer, having conductive and piezoelectric material sub-layers, may increase the stroke per volt while maintaining acceptable stiffness and bandwidth.

Figure 5:
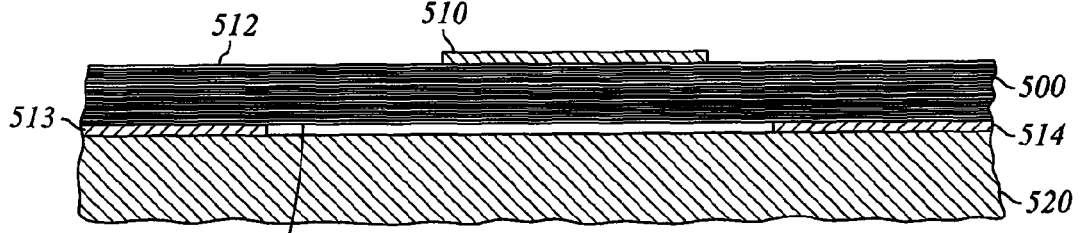
FIG. 5 depicts a magnified side view of one suspended region of a piezoelectric microactuator according to an embodiment of the present invention.

FIG. 5 depicts a magnified side view of one suspended region of a piezoelectric microactuator 500 according to an embodiment of the present invention. The piezoelectric microactuator 500 is shown to be of a laminate construction, and it includes a plurality of piezoelectric sub-layers and a plurality of electrically conductive layers. Each of the plurality of piezoelectric sub-layers preferably has a thickness in the range 0.1 micron to 2 microns. The electrically conductive layers are shown to be horizontal in FIG. 5, which is approximately parallel to the flexure tongue major surface. Each of the plurality of piezoelectric sub-layers is preferably separated from another of the plurality of piezoelectric sub-layers by one of the plurality of electrically conductive layers (e.g. platinum, gold, ruthenium oxide, indium tin oxide, etc).

The piezoelectric microactuator 500 has a plurality of anchor regions, including anchor region 510, that are configured to be bonded to a major surface of a flexure tongue. The flexure tongue is not shown in FIG. 5, but would be a horizontal layer immediately above and bonded to anchor region 510. A non-bonded region 512, that does not contact the flexure tongue, is shown to the left of anchor region 510 in FIG. 5. The non-bonded region 512 shown in the magnified view of FIG. 5 is but one of a plurality of non-bonded regions disposed between pairs of anchor regions.

In the embodiment of FIG. 5, the piezoelectric microactuator 500 also has a plurality of link regions, including link regions 513 and 514, that are bonded to the top surface of read head 520. A non-bonded region 516, that does not contact the read head 520, is shown between the link regions 513 and 514 in FIG. 5. The non-bonded region 516 shown in the magnified view of FIG. 5 is but one of a plurality of non-bonded regions disposed between pairs of link regions.

The piezoelectric microactuator 500 also comprises a plurality of suspended regions. One of the suspended regions is shown in FIG. 5 as the region of the piezoelectric microactuator 500 that is common to (and between) the non-bonded region 512 and the non-bonded region 516. Note that this suspended region does not contact the flexure tongue, and also does not contact the read head 520, which is why it is referred to as a "suspended" region.

Figure 6:
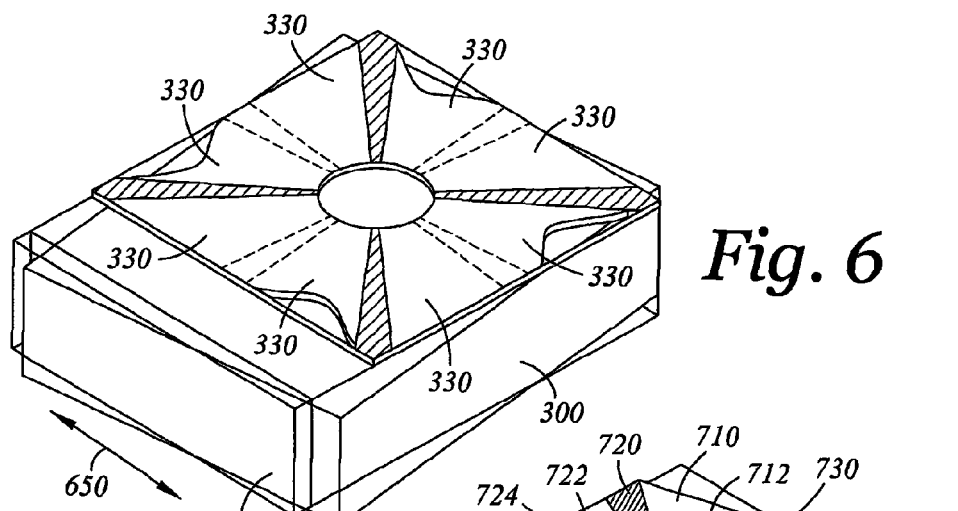
FIG. 6 shows the embodiment of FIG. 3 in operation, with deformations exaggerated 500×.

FIG. 6 shows the embodiment of FIG. 3 in operation, with deformations exaggerated 500×. Note that every other of the eight free regions 330 is actuated to contract, so that each contracting free region contributes an additive (rather than canceling) torque to the read head 300. This causes a net rotation that, in turn, causes a translation 650 of the trailing face 306. Because the read/write transducer is located on the trailing face 306, the translation 650 of the trailing face 306 can be used for dual-stage actuation in a disk drive application. Opposite-handed rotation and translation occurs when the other four free regions 330 are actuated to contract.

The lateral contraction (per volt) of a suspended region may be expressed as:

$$\Delta L/V = d_{31} L/t$$

where L and t are the suspended region lateral dimension and thickness, respectively, and $d_{31}$ is the lateral piezoelectric constant ($d_{31}$~0.05 nm/V for thin-film PZT). Because the factor L/t appears in this equation, the lateral piezoelectric contraction may be influenced by design. However, thickness expansion per volt is a material constant (e.g. $\Delta t/V = d_{33}$~0.1 nm/V). In certain embodiments, the desired stroke per volt of the finished piezoelectric microactuator 310 is preferably in the range of 1-10 nm/V, with a bandwidth in excess of 30 kHz.

It may be preferable from a cost perspective to fabricate the piezoelectric microactuator 310 together with many other piezoelectric microactuators on a wafer, using conventional wafer processing methods. For example, suspension, or release, of a film may be accomplished first by depositing and patterning a sacrificial material. An etch chemistry is used (e.g. isotropic wet or gaseous phase etchants) to remove this sacrificial layer with high etch selectivity (~100:1) to other materials in the structure. For example, anchor or link materials may be deposited in regions free of the sacrificial layer so that a connection to the substrate may be made. Electrodes, piezoelectric layers, and anchors may be deposited over the sacrificial layer. Once formed, the release etch selectively removes the sacrificial layer, suspending the piezoelectric material in the suspended regions. Two such examples of sacrificial materials and their corresponding high-selectivity etches are Si (etches in gaseous $XeF_2$) and Ge (etches in $H_2O/H_2O_2$ mixture). Such sacrificial materials have been successfully used in contemporary micro-electrical-mechanical system (MEMS) device fabrication processes. The materials of the piezoelectric microactuator 310 preferably include lead zirconate titanate, lanthanum-doped lead zirconate titanate, lead magnesium niobate, lead zinc niobate, barium titanate, zinc oxide, aluminum nitride, strontium bismuth tantalate or strontium bismuth titanate.

Figure 7:
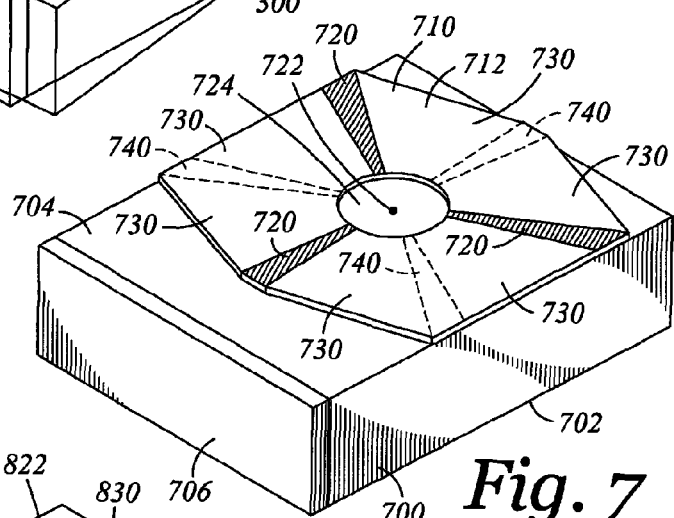
FIG. 7 is a top perspective view of a read head and a piezoelectric microactuator according to another embodiment of the present invention.

FIG. 7 is a top perspective view of a read head 700 and a piezoelectric microactuator 710 according to another embodiment of the present invention. The read head 700 has an air bearing surface 702 and an opposing top surface 704. The read head 700 also has a trailing face 706 that includes a read transducer (not shown) and may also include a write transducer, etc. The piezoelectric microactuator 710 has a first side 712 and an opposing second side (not visible in the view of FIG. 7, because it is the underside of the piezoelectric microactuator 710 that faces the top surface 704 of the read head 700).

The first side 712 of the piezoelectric microactuator 710 faces and is generally parallel to a major surface of the flexure tongue (not shown in FIG. 7 to provide an unobstructed view of the piezoelectric microactuator 710). The first side 712 of the piezoelectric microactuator 710 includes three anchor regions 720 that extend radially from a center point 722. In the embodiment of FIG. 7, a hole 724 extends through the piezoelectric microactuator, and the hole 724 includes the center point 722. The hole 724 preferably has a diameter in the range 0.1 mm to 0.5 mm. Each of the anchor regions 720 is bonded to the flexure tongue, which is what qualifies it to be referred to as an "anchor" region. The first side 712 of the piezoelectric microactuator 710 also includes three non-bonded regions (regions between the anchor regions 720) that are not bonded to the flexure tongue. Each of the non-bonded regions lies between two of the anchor regions 720.

Each of the plurality of anchor regions 720 is preferably an anchor plateau that protrudes from the first side 712 in a direction that is approximately normal to the tongue major surface. In such embodiments, each of the non-bonded regions (between the anchor regions 720) is recessed from the flexure tongue major surface relative to an adjacent anchor plateau. However, the anchor regions 720 alternatively might be formed by a mere distribution of adhesive rather than any actual plateaus in the piezoelectric microactuator 710. Alternatively, a plurality of recessions might be etched into the flexure tongue to distinguish between the anchor regions 720 and non-bonded regions between them.

The second side of piezoelectric microactuator 710 (its underside from the perspective of FIG. 7) includes a plurality of link regions 740 that extend radially from the center point 722. The link regions 740 are shown in phantom lines since they would not normally be visible from the perspective of FIG. 7 (because they would protrude downward from the underside of the piezoelectric microactuator 710 in FIG. 7). Each of the plurality of link regions 740 is bonded to the top surface 704 of the read head 700. Three non-bonded regions, that are not bonded to the top surface of the read head, lie on the second side of the piezoelectric microactuator 710 between each pair of the plurality of link regions 740. Note that each of the plurality of link regions 740 is angularly spaced between two of the plurality of anchor regions 720. Preferably, in the embodiment of FIG. 7, each of the link regions 740 is angularly spaced between two of the plurality of anchor regions 720 by an average angular spacing of no more than 60°. Such inequality is preferred for embodiments that include at least three anchor regions 720 and at least three link regions 740.

Each of the plurality of link regions 740 is preferably a link plateau that protrudes from the second side of the piezoelectric microactuator 710 in a direction that is approximately normal to the top surface 704 of the read head 700. In such embodiments, each of the non-bonded regions (between the link regions 740) is recessed from the top surface of the read head relative to an adjacent link plateau. However, the link regions 740 alternatively might be formed by a mere distribution of adhesive rather than any actual plateaus in the piezoelectric microactuator 710. Alternatively, a plurality of recessions might be etched into the top surface of the read head (e.g. at the bar level stage of slider fabrication) to distinguish between the link regions 740 and non-bonded regions between them.

The embodiment of FIG. 7 includes six wedge-shaped free regions 730 that are common to both the non-bonded regions on the first side 712 (between anchor regions 720) and the non-bonded regions on the second side (the underside of piezoelectric microactuator 710). The free regions 730 are neither bonded to the flexure tongue nor to the read head 700, which is why they are referred to as "free" regions. In certain embodiments, the free regions 730 are not only non-bonded to the flexure tongue and the read head 700, but also do not contact the flexure tongue and the read head 700. In such embodiments the free regions 730 are also referred to as being "suspended" regions, and surface friction between them and the flexure tongue and/or read head 700 is negligible.

Figure 8:
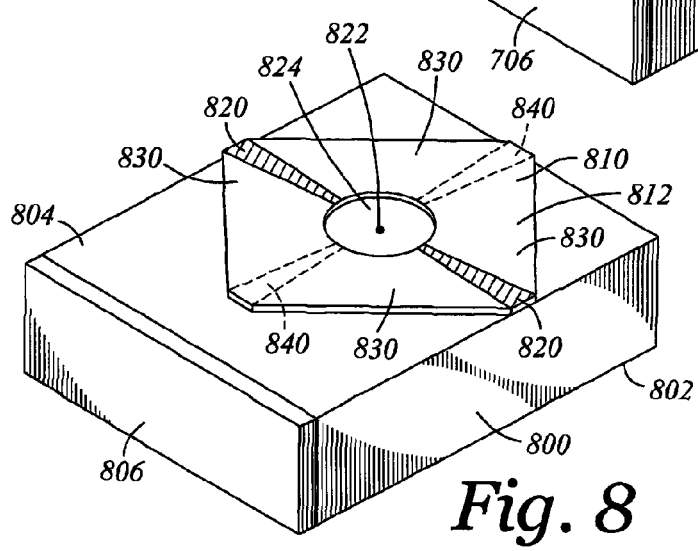
FIG. 8 is a top perspective view of a read head and a piezoelectric microactuator according to another embodiment of the present invention.

FIG. 8 is a top perspective view of a read head 800 and a piezoelectric microactuator 810 according to another embodiment of the present invention. The read head 800 has an air bearing surface 802 and an opposing top surface 804. The read head 800 also has a trailing face 806 that includes a read transducer (not shown) and may also include a write transducer, etc. The piezoelectric microactuator 810 has a first side 812 and an opposing second side (not visible in the view of FIG. 8, because it is the underside of the piezoelectric microactuator 810 that faces the top surface 804 of the read head 800).

The first side 812 of the piezoelectric microactuator 810 faces and is generally parallel to a major surface of the flexure tongue (not shown in FIG. 8 to provide an unobstructed view of the piezoelectric microactuator 810). The first side 812 of the piezoelectric microactuator 810 includes two anchor regions 820 that extend radially from a center point 822. In the embodiment of FIG. 8, a hole 824 extends through the piezoelectric microactuator, and the hole 824 includes the center point 822. The hole 824 preferably has a diameter in the range 0.1 mm to 0.5 mm. Each of the anchor regions 820 is bonded to the flexure tongue, which is what qualifies it to be referred to as an "anchor" region. The first side 812 of the piezoelectric microactuator 810 also includes two non-bonded regions (regions angularly between the anchor regions 820) that are not bonded to the flexure tongue. Each of the non-bonded regions lies angularly between the two anchor regions 820.

Each of the plurality of anchor regions 820 is preferably an anchor plateau that protrudes from the first side 812 in a direction that is approximately normal to the tongue major surface. In such embodiments, each of the non-bonded regions (angularly between the anchor regions 820) is recessed from the flexure tongue major surface relative to an adjacent anchor plateau. However, the anchor regions 820 alternatively might be formed by a mere distribution of adhesive rather than any actual plateaus in the piezoelectric microactuator 810. Alternatively, a plurality of recessions might be etched into the flexure tongue to distinguish between the anchor regions 820 and non-bonded regions angularly between them.

The second side of piezoelectric microactuator 810 (its underside from the perspective of FIG. 8) includes two link regions 840 that extend radially from the center point 822. The link regions 840 are shown in phantom lines since they would not normally be visible from the perspective of FIG. 8 (because they would protrude downward from the underside of the piezoelectric microactuator 810 in FIG. 8). Each of the plurality of link regions 840 is bonded to the top surface 804 of the read head 800. Two non-bonded regions, that are not bonded to the top surface of the read head, lie on the second side of the piezoelectric microactuator 810 angularly between the link regions 840. Note that each of the link regions 840 is angularly spaced between the two anchor regions 820. Preferably, in the embodiment of FIG. 8, each of the link regions 840 is angularly spaced between two of the plurality of anchor regions 820 by an average angular spacing of no more than 90°.

Each of the link regions 840 is preferably a link plateau that protrudes from the second side of the piezoelectric microactuator 810 in a direction that is approximately normal to the top surface 804 of the read head 800. In such embodiments, each of the non-bonded regions (angularly between the link regions 840) is recessed from the top surface 804 of the read head 800 relative to an adjacent link plateau. However, the link regions 840 alternatively might be formed by a mere distribution of adhesive rather than any actual plateaus in the piezoelectric microactuator 810. Alternatively, a plurality of recessions might be etched into the top surface 804 of the read head 800 (e.g. at the bar level stage of slider fabrication) to distinguish between the link regions 840 and non-bonded regions angularly between them.

The embodiment of FIG. 8 includes four wedge-shaped free regions 830 that are common to both the non-bonded regions on the first side 812 (angularly between anchor regions 820) and the non-bonded regions on the second side (the underside of piezoelectric microactuator 810). The free regions 830 are neither bonded to the flexure tongue nor to the read head 800, which is why they are referred to as "free" regions. In certain embodiments, the free regions 830 are not only non-bonded to the flexure tongue and the read head 800, but also do not contact the flexure tongue and the read head 800. In such embodiments the free regions 830 are also referred to as being "suspended" regions, and surface friction between them and the flexure tongue and/or read head 800 is negligible.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A head gimbal assembly (HGA) comprising:
   a read head having an air bearing surface and an opposing top surface;
   a load beam;
   a flexure attached to the load beam, the flexure including a tongue having a tongue major surface;
   a piezoelectric microactuator having a first side and an opposing second side, the first side facing and being generally parallel to the tongue major surface,
   wherein the first side comprises
      a plurality of anchor regions that extend radially from a center point, each of the plurality of anchor regions being bonded to the tongue, and
      a first plurality of non-bonded regions that are not bonded to the tongue, each of the first plurality of non-bonded regions lying between two of the plurality of anchor regions,
   and wherein the second side comprises
      a plurality of link regions that extend radially from the center point, each of the plurality of link regions being bonded to the top surface of the read head, and
      a second plurality of non-bonded regions that are not bonded to the top surface of the read head, each of the second plurality of non-bonded regions lying between two of the plurality of link regions, and
   wherein each of the plurality of link regions is angularly spaced between two of the plurality of anchor regions.

2. The HGA of claim 1 wherein each of the plurality of anchor regions is an anchor plateau that protrudes from the first side in a direction that is approximately normal to the tongue major surface.

3. The HGA of claim 2 wherein each of the first plurality of non-bonded regions is recessed from the tongue major surface relative to an adjacent anchor plateau.

4. The HGA of claim 2 wherein each of the anchor plateaus comprises a malleable metal layer and a dielectric layer.

5. The HGA of claim 4 wherein the malleable metal layer comprises gold, and the dielectric layer comprises silicon oxide.

6. The HGA of claim 3 wherein the adjacent anchor plateau protrudes from the first side in a direction that is approximately normal to the tongue major surface, by at least 1 micron to 20 microns relative to at least one of the first plurality of non-bonded regions.

7. The HGA of claim 1 wherein each of the plurality of link regions is a link plateau that protrudes from the second side in a direction that is approximately normal to the read head top surface.

8. The HGA of claim 7 wherein each of the second plurality of non-bonded regions is recessed from the read head top surface relative to an adjacent link plateau.

9. The HGA of claim 7 wherein each of the link plateaus comprises a malleable metal layer and a dielectric layer.

10. The HGA of claim 9 wherein the malleable metal layer comprises gold, and the dielectric layer comprises silicon oxide.

11. The HGA of claim 8 wherein the adjacent link plateaus protrudes from the second side in a direction that is approximately normal to the read head top surface, by at least 1 micron to 20 microns relative to at least one of the second plurality of non-bonded regions.

12. The HGA of claim 1 wherein the piezoelectric microactuator comprises a material selected from the group consisting of: lead zirconate titanate, lanthanum-doped lead zirconate titanate, lead magnesium niobate, lead zinc niobate, barium titanate, zinc oxide, aluminum nitride, strontium bismuth tantalate and strontium bismuth titanate.

13. The HGA of claim 1 wherein the piezoelectric microactuator comprises a laminated construction that includes a plurality of piezoelectric sub-layers, and a plurality of electrically conductive layers, and wherein each of the plurality of piezoelectric sub-layers is separated from another of the plurality of piezoelectric sub-layers by one of the plurality of electrically conductive layers.

14. The HGA of claim 13 wherein each of the plurality of electrically conductive layers is approximately parallel to the tongue major surface.

15. The HGA of claim 13 wherein each of the plurality of piezoelectric sub-layers has a thickness in the range 0.1 micron to 2 microns.

16. The HGA of claim 1 wherein the piezoelectric microactuator has a maximum thickness, measured approximately normal to the tongue major surface, in the range 5 microns to 50 microns.

17. The HGA of claim 1 wherein the plurality of anchor regions comprises at least four anchor regions, and wherein the plurality of link regions comprises at least four link regions, and wherein at least one of the plurality of link regions is angularly spaced between two of the plurality of anchor regions by an average angular spacing of no more than 45 degrees.

18. The HGA of claim 1 wherein the plurality of anchor regions consists of three anchor regions, and wherein the plurality of link regions consists of three link regions, and wherein at least one of the plurality of link regions is angularly spaced between two of the plurality of anchor regions by an average angular spacing of no more than 60 degrees.

19. The HGA of claim 1 further comprising a hole through the piezoelectric microactuator, the hole including the center point.

20. The HGA of claim 19 wherein the hole has a diameter in the range 0.1 mm to 0.5 mm.

21. A head gimbal assembly (HGA) comprising:
a read head having an air bearing surface and an opposing top surface;
a load beam;
a flexure attached to the load beam, the flexure including a tongue having a tongue major surface;
a piezoelectric microactuator having a first side and an opposing second side, the first side facing and being generally parallel to the tongue major surface,
the first side being bonded to the tongue major surface by a plurality of anchor regions that extend radially from a center point, the second side being bonded to the top surface of the read head by a plurality of link regions that extend radially from the center point,
wherein each of the plurality of link regions is angularly spaced between two of the plurality of anchor regions, and
wherein the piezoelectric microactuator comprises a plurality of suspended regions, each of the plurality of suspended regions being suspended between adjacent ones of the plurality of link regions and the plurality of anchor regions, and
wherein each of the plurality of suspended regions does not contact the tongue and does not contact the read head.

22. The HGA of claim 21 further comprising a hole through the piezoelectric microactuator, the hole including the center point.

23. The HGA of claim 21 wherein the piezoelectric microactuator comprises a laminated construction that includes a plurality of piezoelectric sub-layers, and a plurality of electrically conductive layers, and wherein each of the plurality of piezoelectric sub-layers is separated from another of the plurality of piezoelectric sub-layers by one of the plurality of electrically conductive layers.

24. The HGA of claim 21 wherein the plurality of anchor regions consists of two anchor regions, and wherein the plurality of link regions consists of two link regions, and wherein at least one of the two link regions is angularly spaced between the two anchor regions by an average angular spacing of no more than 90 degrees.

* * * * *